US008163057B2

(12) United States Patent
Blossey et al.

(10) Patent No.: US 8,163,057 B2
(45) Date of Patent: Apr. 24, 2012

(54) AIR FILTER HOUSING FOR AN AIR FILTER ELEMENT

(75) Inventors: Werner Blossey, Benningen (DE); Mario Rieger, Freiberg (DE); Lorenz Eilert, Braunschweig (DE)

(73) Assignee: Mann + Hummelll GmbH, Ludwigsburg (DE)

( * ) Notice: Subject to any disclaimer, the term of this patent is extended or adjusted under 35 U.S.C. 154(b) by 482 days.

(21) Appl. No.: 12/302,097

(22) PCT Filed: Apr. 13, 2007

(86) PCT No.: PCT/EP2007/053641
§ 371 (c)(1),
(2), (4) Date: Aug. 28, 2009

(87) PCT Pub. No.: WO2007/137904
PCT Pub. Date: Dec. 6, 2007

(65) Prior Publication Data
US 2009/0320686 A1 Dec. 31, 2009

(30) Foreign Application Priority Data
May 29, 2006 (DE) .......................... 10 2006 025 236

(51) Int. Cl.
*B01D 46/00* (2006.01)
(52) U.S. Cl. ......... 55/503; 55/385.3; 55/502; 123/198 E
(58) Field of Classification Search .................... 55/497, 55/502, 503, 504, 385.3; 123/198 E
See application file for complete search history.

(56) References Cited

U.S. PATENT DOCUMENTS

| 4,861,359 A * | 8/1989 | Tettman ........................... 55/419 |
| 6,263,850 B1 | 7/2001 | Winmill et al. |
| 6,568,540 B1 * | 5/2003 | Holzmann et al. ............. 210/445 |
| 7,625,419 B2 * | 12/2009 | Nelson et al. .................... 55/521 |
| 2008/0276582 A1 * | 11/2008 | Boehrs et al. ................... 55/497 |
| 2008/0307759 A1 * | 12/2008 | Reichter et al. ................. 55/428 |

FOREIGN PATENT DOCUMENTS

| DE | 2630875 A1 | 1/1978 |
| DE | 2630875 A1 * | 1/1978 |
| DE | 3705951 C1 * | 3/1988 |
| DE | 3705951 C1 | 3/1988 |

(Continued)

OTHER PUBLICATIONS

Machine translation of JP 2003161216, published Jun. 6, 2003.*

(Continued)

*Primary Examiner* — Robert Clemente
(74) *Attorney, Agent, or Firm* — James Hasselbeck

(57) ABSTRACT

In an air filter housing (100) for an air filter element (2) with at least one housing bottom part (10) into which the air filter element (2) can be inserted completely or with a substantial portion of its length and a cover element (20) to be connected to the housing bottom part (10), on the housing bottom part (10) and on the cover element (20) at least one connector socket (14, 15) for connection to a hose conduit is provided, respectively. The connector socket for the side of the air filter element facing the cover element (20) is designed as a deflecting connector socket (14) that extends at least partially outside of the cross-sectional area covered by the air filter element (2) and that is connected to the housing bottom part (10).

9 Claims, 4 Drawing Sheets

FOREIGN PATENT DOCUMENTS

| | | | |
|---|---|---|---|
| DE | 10328002 A1 * | 1/2005 | |
| DE | 10328002 A1 | 1/2005 | |
| EP | 0534079 A2 | 3/1993 | |
| EP | 0534079 A2 * | 3/1993 | |
| EP | 1679436 A | 7/2006 | |
| EP | 1679436 A * | 7/2006 | |
| JP | 2003161216 A * | 6/2003 | |
| JP | 2003161216 A | 6/2003 | |
| WO | WO 02/31340 A * | 4/2002 | |
| WO | WO02/31340 A | 4/2002 | |
| WO | WO 2005/046841 A * | 5/2005 | |
| WO | WO20051046841 A | 5/2005 | |

OTHER PUBLICATIONS

Machine translation of DE 10328002, published Jan. 13, 2005.*
Machine translation of DE 2630875, published Jan. 12, 1978.*
Machine translation of DE 3705951, published Mar. 24, 1988.*
Machine translation of EP 0534079, published Mar. 31, 1993.*

* cited by examiner

AIR FILTER HOUSING FOR AN AIR FILTER ELEMENT

TECHNICAL FIELD

The invention concerns an air filter housing for an air filter element, comprising at least one housing bottom part into which the air filter element can be inserted completely or with a substantial portion of its length and a cover element to be connected to the housing bottom part, wherein on the housing bottom part and on the cover element at least one connector socket for connecting a hose conduit is provided, respectively.

PRIOR ART

Air filter housings are often designed such that a connector socket at the unfiltered air side, the housing of a two-part configuration with the air filter element inserted therein, and a connector socket at the filtered air side are aligned with one another or at least are approximately axis-parallel. In order to the air filter element that is either a round filter or a compact air filter element of wound filter paper, the air connecting hose is released from the connector socket of the cover element and the cover element is removed from the housing bottom part. Accordingly, the housing bottom part is freely accessible and the air filter element can be exchanged in a simple way. It is however disadvantageous that the air connecting hose in case of tight space conditions, as for example encountered often in the engine compartment of motor vehicles, is not sufficiently long and/or flexible in order to remain attached to the cover element when the latter is removed from the housing bottom part. The required detachment of the hose and the subsequent re-attachment require a significant amount of time when performing the filter element change. There is also the problem that, under shop conditions or even under construction site conditions in the case of trucks, the hose connection cannot always be precisely produced. For example, when tightening too much the hose clamp that secures the air connecting hose on the connector socket it can happen that the air filter housing usually made from plastic material will break.

It is therefore the object of the invention to further develop an air filter housing of the aforementioned kind in such way that a change of the filter element can be performed more quickly and in particular without disconnecting the hose connection.

DISCLOSURE OF THE INVENTION

According to the invention, the pipe socket on the cover element ends outside of the cross-sectional area that is covered by the air filter element, i.e., it projects outwardly. In this way, in the cover element a flow deflection from the connector socket that is laterally arranged on the air filter housing onto the end face of the air filter insert element is effected and the accessibility of both connector sockets from one side is improved. Both hoses can remain connected to the air filter housing according to the invention when the cover element is removed for servicing purposes.

The air filter housing according to the invention can be operated in both flow directions. Preferably, the unfiltered air side is connected to the deflecting connector socket. A further advantage of the air filter housing according to the invention then resides in that for an arrangement of the air filter housing according to the invention with the cover element located at the bottom a simple separation of water is possible. Sucked-in water is removed during deflection of the air flow as a result of gravity and the additional centrifugal force against the inner side of the cover element. At this location a depression can be provided and a water outlet valve can extend from it to the exterior. The water outlet valve is designed in particular such that it opens only when a certain pressure is present, i.e., a water column of a certain height is present.

The separating effect is increased by the additional centrifugal force when the flow deflection is realized across a greater angle. It is in particular advantageous when the mouth of the deflecting connector socket has an angle of less than 90 degrees relative to a main flow direction extending through the air filter element, i.e., is oriented almost backwards relative to the main flow direction. Moreover, in this embodiment both connector sockets open toward one side, even if they are not aligned exactly parallel with one another so that the cover element is especially easily accessible.

It is especially advantageous in this case that the connector socket attachment element is integrally formed laterally on the housing bottom part and that in this connection a planar separation plane is formed against which preferably the air filter insert element rests directly by means of its sealing ring and at which also the deflecting connector socket ends. Accordingly, the cover element can be provided with a collar that is positioned within a plane. In this way, it is possible in a particularly easy way to connect both housing parts and the air filter insert in a seal-tight manner.

A second embodiment of an air filter housing according to the invention provides only a lateral flow deflection at an angle of greater than 90 degrees relative to the main flow direction. In this connection, it is provided that at least on one side of the housing bottom part a collar is formed that is arranged outside of the cross-sectional area covered by the air filter insert element so that the air filter element can be removed easily past the collar. In order to effect a flow deflection at all, the collar must project past the sealing plane or the end face of the air filter element. Beginning at the collar, the deflecting connector socket then projects outwardly, i.e., the inner space is not narrowed by the deflecting connector socket. The filter insert element can be removed past the collar. The cover element covers the space adjacent to the collar area so that a uniform hood is formed that covers the deflecting connector socket and the end face of the air filter element and that effects the flow deflection. Mounting and demounting of the air filter housing are facilitated by the connection of the compact air filter element to a part of the housing wall.

Preferably, the cover element has a closed projecting rim that forces the air filter element with its circumferentially extending sealing ring against a support on the housing bottom part. In this connection, the circumferentially extending projecting rim is designed also such that it can be pushed past the collar area for the deflecting connector socket.

it is advantageous to support the projecting rim for applying pressure on the sealing ring of the air filter insert element by several ribs on the outer skin of the cover element. In this way it is ensured that on all sides a pressing force that is sufficiently large acts on the sealing ring of the air filter insert element. At the same time, the flow resistance is not significantly impaired by the narrow ribs that are preferably oriented in the flow direction.

Moreover, it is possible to provide a separating screen such as a snow collecting screen or a so-called cigarette screen in front of the flow deflection site in the cover element. It is thus possible to deflect laterally sucked-in snow or sucked-in ashes before impacting on the end face of the air filter insert element.

BRIEF DESCRIPTION OF THE DRAWINGS

The invention will be explained in the following in more detail with reference to the drawing. The Figures show in detail in.

EMBODIMENT(S) OF THE INVENTION

Figure 1:
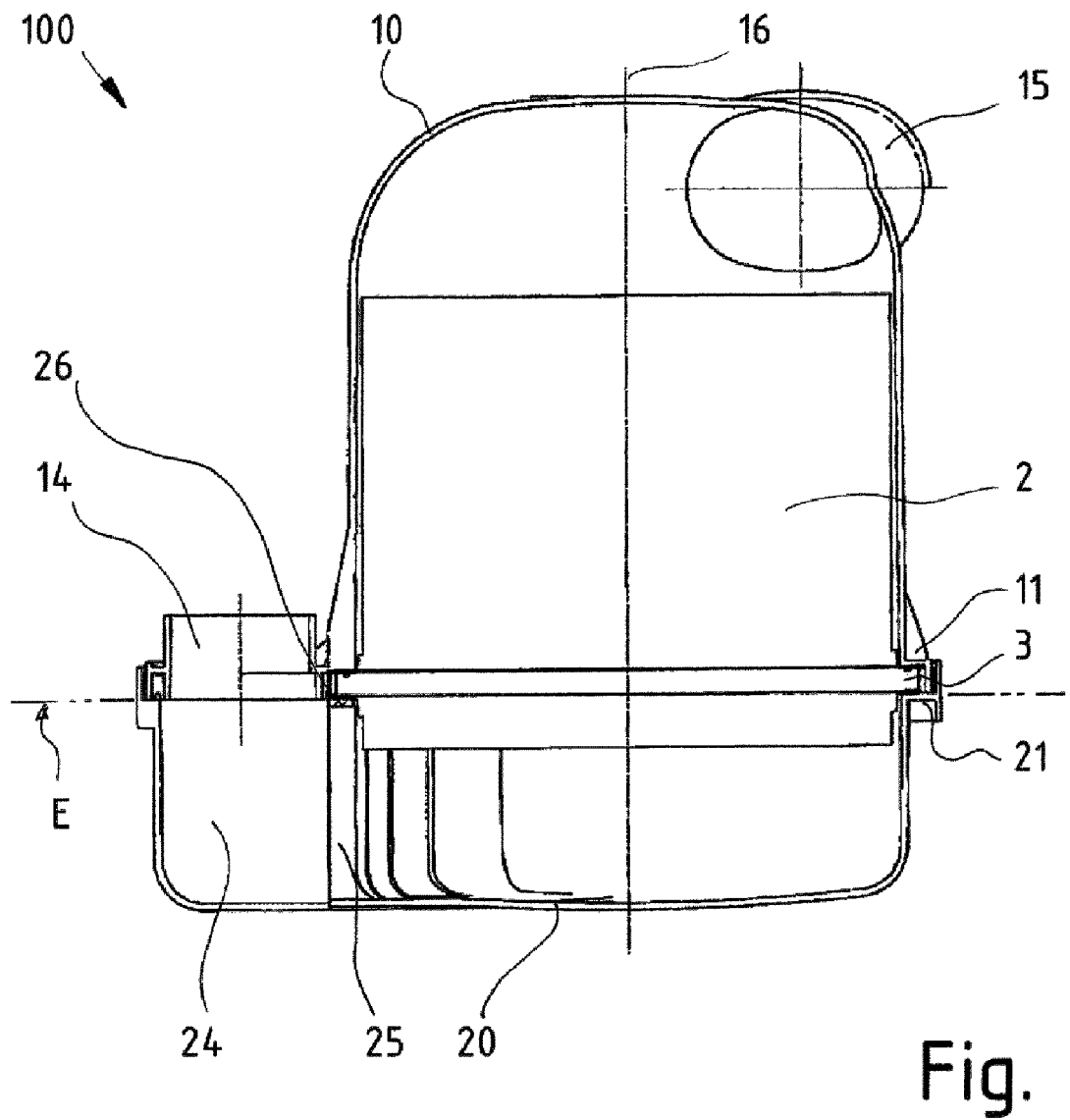
FIG. 1 a first embodiment of an air filter housing in a section view.

FIG. 1 shows an air filter housing 100 according to a first embodiment in section. It is comprised essentially of a housing bottom part 10 and a cover element 20. Both enclose an air filter element 2 that is in particular a wound compact air filter element. A main flow direction 16 through the air filter element extends parallel to the center axis of the air filter element 2. At both end faces of the air filter element 2 there are cavities formed in the air filter housing 100 that end in connector sockets 14, 15. For example, the connector socket 14 is provided for connecting a hose thereto through which the unfiltered raw air is sucked in.

It is essential to the invention that the connector socket that is in communication with the cavity in the cover element 20 is embodied as a deflecting connector socket 14, i.e., it is not oriented in the main flow direction 16 in front of the end face of the air filter element 2 but is laterally mounted on the housing bottom part 10 and is thus positioned outside of the cross-sectional area that is covered by the air filter element 2. The cover 20 widens to the left wherein the widened section 24 opens at the deflecting connector socket 14. The deflecting connector socket 14 is thus arranged such that the air filter element 2 can be removed past it from the housing bottom part 10 so that even a hose connection mounted on the deflecting connector socket 14 need not be released.

The part of the deflecting connector socket 14 that is integrally formed on the housing bottom part 10 and the housing bottom part 10 have a uniform separation plane E where the air filter element 2 rests with its sealing ring 3. For reinforcement, a projecting rim 11 is formed on the housing bottom part 10 that is surrounded by a projecting rim 21 of the attached cover element 20. At the same time, the projecting rim 21 of the cover element 20 presses against the sealing ring 3 and forces it against the corresponding support shoulder on the projecting rim 11 of the housing bottom part 10. In this way, the air filter element 2 is sealed laterally relative to the air filter housing; leakage flows of unfiltered air are prevented.

In the area of the transition of the housing bottom part 10 into the integrally formed deflecting connector socket 14, the projecting rim 11 is not completely supported because the air-guiding path in the cover element 20 is located underneath. In order to provide in this area also a satisfactory pressing action on the sealing ring 3 of the air filter element 2, a web 26 is provided that rests against the sealing ring 3 and is supported by means of support ribs 25 on the outer skin of the cover element 20.

Figure 2:
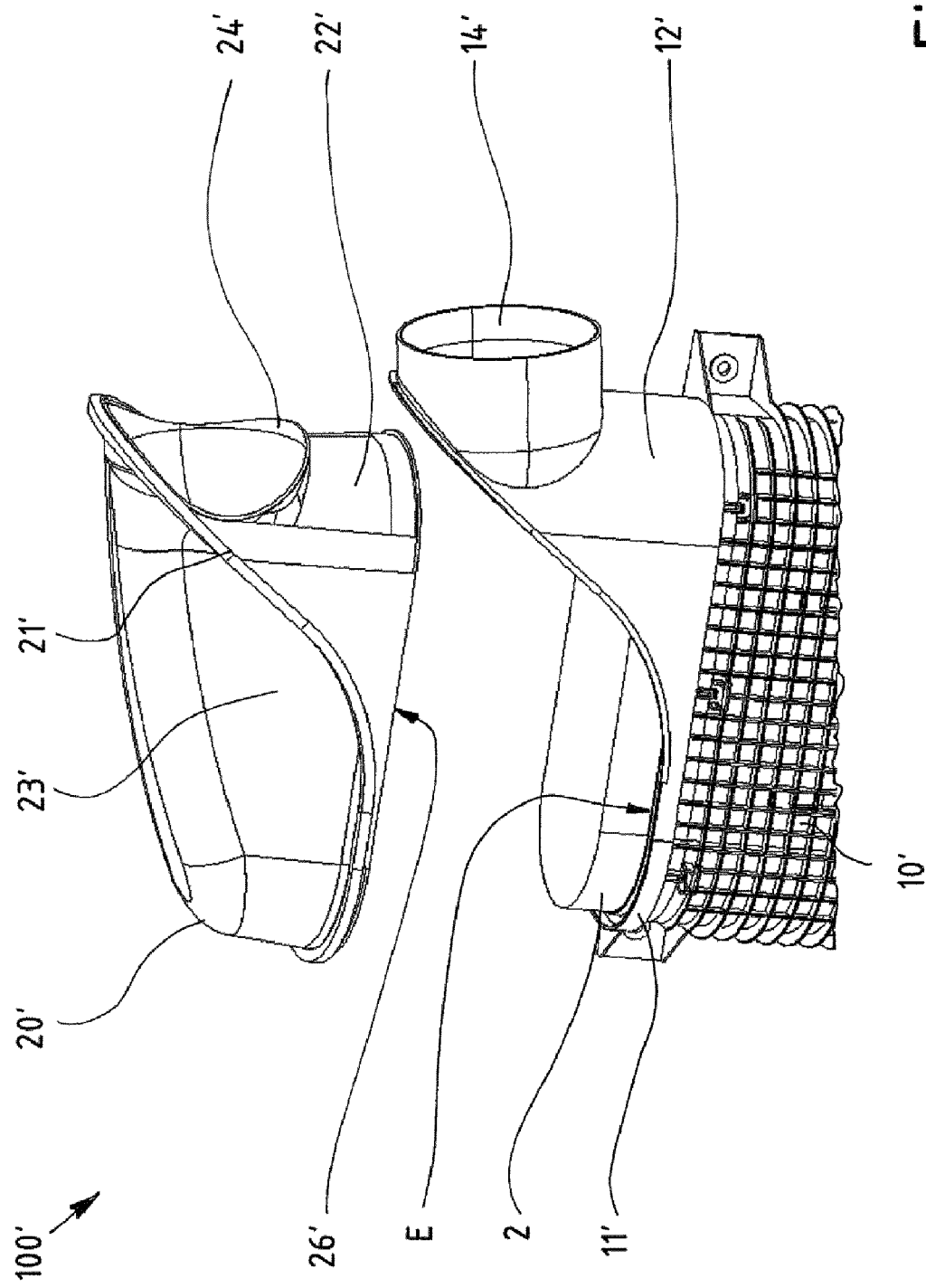
FIGS. 2, 3 a second embodiment of an air filter housing in different mounting stages in a perspective view.
Figure 3:
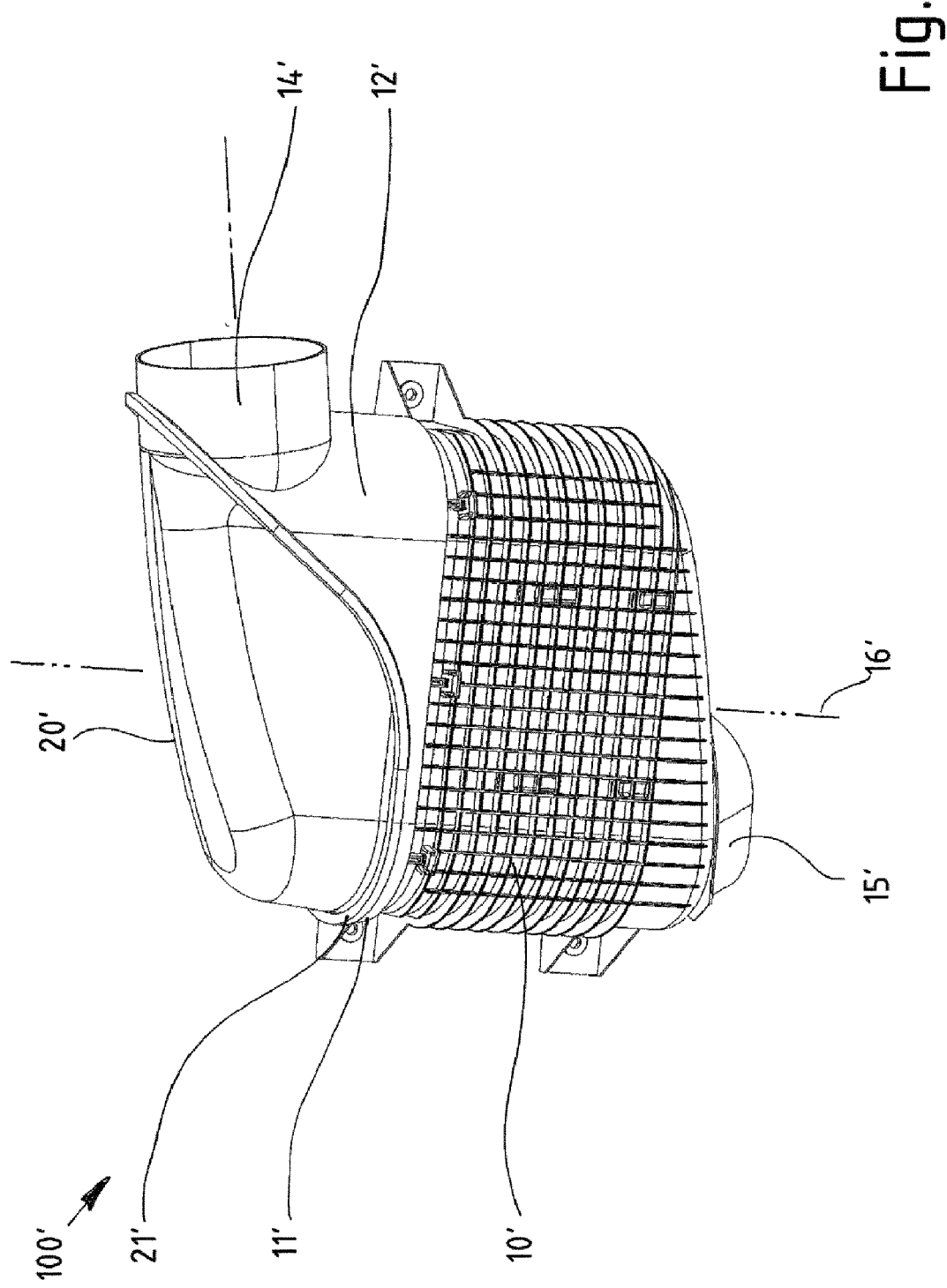

FIG. 2 shows a further embodiment of an air filter housing 100' that also comprises a housing bottom part 10' with a connector socket 15' and a cover element 20' placed thereon. In this embodiment, the connector socket that is in communication with the space in the cover element is also outside of the cross-sectional area that is covered by the air filter element 2 to be arranged in the housing bottom part 10' and is embodied as a deflecting connector socket 14'. Its mouth is positioned at an angle relative to the main flow direction 16' which angle, in the illustrated embodiment, is in particular greater than 90 degrees. The deflecting connector socket 14' is integrally formed on a collar 12' that is not only laterally outside of the cross-sectional area covered by the air filter 2 but also projects past a sealing plane E and projects correspondingly far from the housing part 10'.

As also shown in the illustration of FIG. 2 of housing bottom part 10' and cover element 20' before assembly, the collar 12' has a corresponding element, in the form of a collar section 22', on the cover element 20' and the deflecting connector socket 14' has a corresponding element, in the form of the socket projection 24', on the cover element 20'.

A projecting rim 11' of the housing bottom part 10 extends from the sealing plane of the air filter element 2, to the left in the illustration, up to the collar 12' past the deflecting connector socket 14'. A correspondingly shaped projecting rim 21' is provided on the cover element 20'.

The sealing ring of the air filter element 2 has a support rim in the housing bottom part 10' which support rim is positioned in a plane but is not visible here. In order to press the sealing ring against the support rim, in addition to the projecting rim 21' a planar bottom edge 26' is provided on the cover element 20' that extends below the collar section 22' and a hood section 23'. When the cover element 20' is placed onto or into the housing bottom part 10', the bottom edge 26' presses onto the sealing ring of the air filter element 2 and seals it relative to lateral leakage flows. Moreover, a sealing action of the air filter housing 100' itself is effected by seals between the projected rims 11', 21'.

Figure 4:
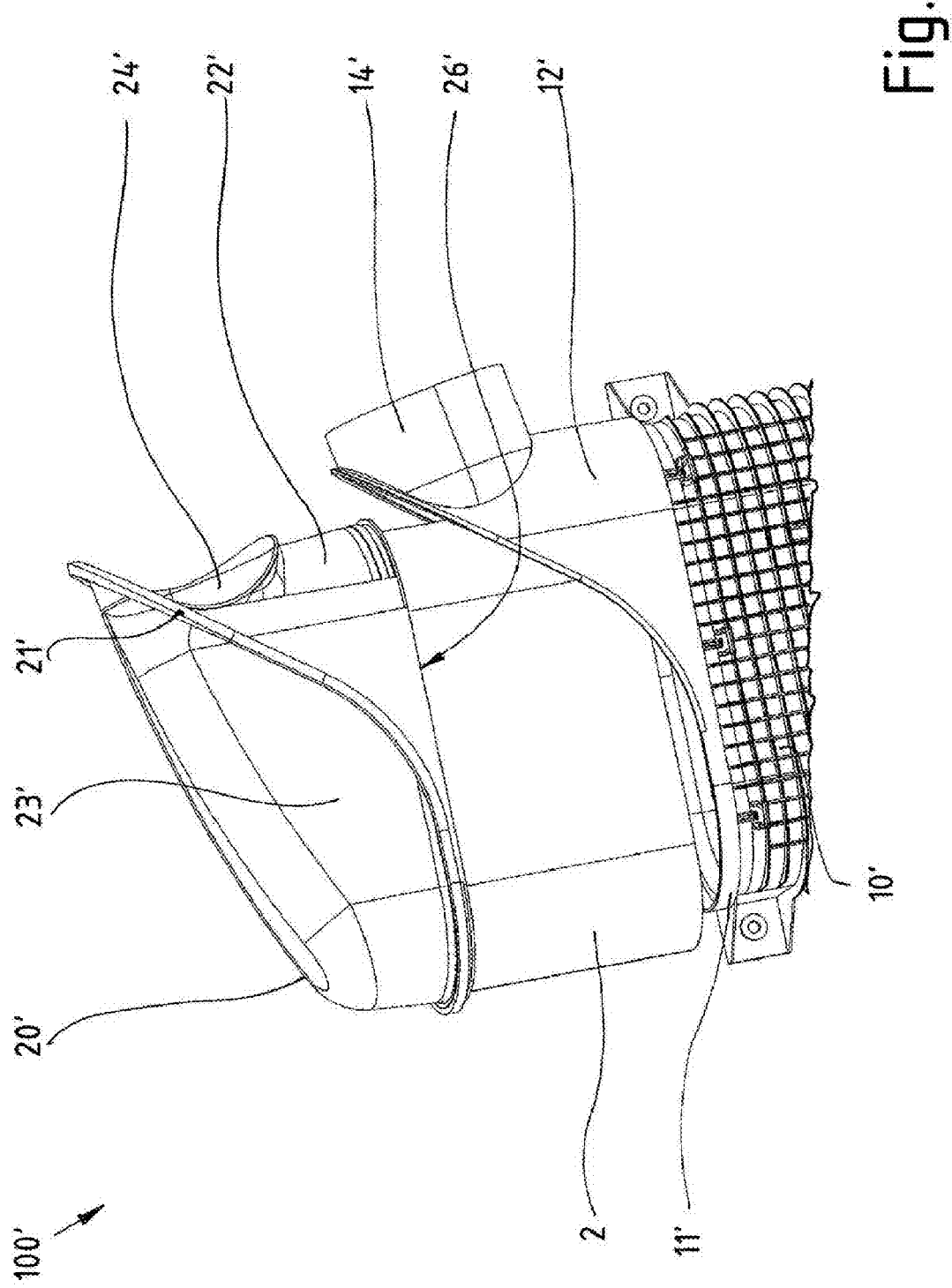
FIG. 4 a modification of the second embodiment, also in a perspective view.

FIG. 4 shows a slightly modified form of the last described air filter housing 100'. Cover element 20' and housing bottom part 10' are unchanged. Only the air filter element 2 is fixedly connected to the cover element 20' in this embodiment. They together form a unit that can be exchanged together for servicing purposes. The advantage resides in particular in that the cover element 20' that possibly becomes very dirty when connected to the unfiltered air intake is exchanged also at the same time. This prevents that upon filter exchange deposits on a dirty cover element 20' will detach, lodge directly into the newly inserted filter element, and thus reduce its service life. This holds true especially when the air filter housing is used with cover element 20' positioned at the bottom and dirty water separated from the air flow collects in the cover element 20.

The invention claimed is:

1. Air filter housing (100') for an air filter element (2), comprising
   at least one housing bottom part (10; 10') into which the air filter element (2) can be inserted completely or with a substantial portion of its length and a cover element (20; 20') to be connected to the housing bottom part (10; 10'),
   wherein on the housing bottom part (10; 10') and on the cover element (20; 20') at least one connector socket (14, 15; 14', 15') for connection to a hose conduit is provided, respectively,
   wherein the connector socket for a side of the air filter element oriented toward the cover element (20, 20') is designed as a deflecting connector socket (14, 14') that at least partially extends outside of a cross-sectional area covered by the air filter element (2) and is connected to the housing bottom part (10) 10'),
   wherein the defecting connector socket (14') is integrally formed on a collar (12') at the housing bottom part (10') which is arranged outside of the cross-sectional area covered by the air filter element (2) and which extends past a sealing plane (E) and/or an end face of the air filter element (2).

2. Air filter housing (100) according to claim 1, wherein
a mouth of the defection connector socket (14) is positioned at an angle of less than 90 degrees relative to a main flow direction (16) extending through the air filter element (2) or is arranged parallel thereto.

3. Air filter housing (100) according to claim 2, wherein the cover element (20) comprises a water outlet valve.

4. Air filter housing (100) according to claim 2 or 3, wherein
a uniform separation plane (E) is formed between the housing bottom part (10) with the deflecting connector socket (14) and the cover element (20).

5. Air filter housing (100) according to claim 4, wherein
a compact air filter element (2) is arranged in the housing bottom part (10) which at its circumference is provided with a sealing ring (3) positioned in the separation plane (E) or bordering it.

6. Air filter housing (100') according to claim 1, wherein
a mouth of the defecting connector sockets (14') is positioned at an angle of greater than 90 degrees relative to a main flow direction (16') extending through the air filter element (2).

7. Air filter housing (100; 100') according to claim 1, wherein
in the deflecting connector socket (14; 14') a separation screen is arranged.

8. Air filter housing (100; 100') according to claim 1, wherein
a sealing ring (3) of the air filter element (2) can be pressed between a support shoulder of the housing bottom part (10, 10') and a planar web (26) bridging the space in the cover element (20) and/or a bottom edge (26') of the cover element (20, 20').

9. Air filter housing (100; 100') according to claim 8, wherein
the web (26) is supported by at least one support rib (25) on the outer skin of the cover element (20, 20').

\* \* \* \* \*